(12) United States Patent
Sicard

(10) Patent No.: US 11,092,188 B2
(45) Date of Patent: Aug. 17, 2021

(54) ANTI-LOOSENING FASTENER

(71) Applicant: Richard C. Sicard, Stoughton, MA (US)

(72) Inventor: Richard C. Sicard, Stoughton, MA (US)

( * ) Notice: Subject to any disclaimer, the term of this patent is extended or adjusted under 35 U.S.C. 154(b) by 210 days.

(21) Appl. No.: 16/412,480

(22) Filed: May 15, 2019

(65) Prior Publication Data

US 2020/0362906 A1 Nov. 19, 2020

(51) Int. Cl.
*F16B 39/12* (2006.01)
*F16B 39/16* (2006.01)
*F16B 41/00* (2006.01)

(52) U.S. Cl.
CPC ............ *F16B 39/16* (2013.01); *F16B 41/002* (2013.01)

(58) Field of Classification Search
CPC ............................... F16B 39/16; F16B 41/002
USPC ......................................... 411/214, 215, 223
See application file for complete search history.

(56) References Cited

U.S. PATENT DOCUMENTS

| | | | | |
|---|---|---|---|---|
| 280,125 A * | 6/1883 | Brauchler | ............... | F16B 39/16 411/190 |
| 893,081 A * | 7/1908 | Kunan | ..................... | F16B 39/02 411/215 |
| 919,170 A * | 4/1909 | Holestein | ................. | F16B 39/12 411/198 |
| 1,230,745 A * | 6/1917 | Madison | ............... | F16B 37/145 411/214 |
| 1,241,181 A * | 9/1917 | Wilheim | ............... | F16B 39/108 411/201 |
| 3,964,530 A * | 6/1976 | Nickles | .................... | F16B 39/10 411/195 |
| 4,253,509 A * | 3/1981 | Collet | ................... | F16B 41/005 411/214 |
| 4,342,530 A * | 8/1982 | Baker | ..................... | F16B 37/14 277/640 |
| 5,391,032 A * | 2/1995 | Vassalotti | ............... | F16B 39/12 411/198 |
| 8,113,754 B2 * | 2/2012 | Dahl | ....................... | F16B 39/02 411/215 |
| 8,172,496 B2 * | 5/2012 | Vile | ......................... | F16B 39/16 411/190 |

* cited by examiner

*Primary Examiner* — Gary W Estremsky
(74) *Attorney, Agent, or Firm* — The Iwashko Law Firm, PLLC; Lev Ivan Gabriel Iwashko

(57) ABSTRACT

An anti-loosening fastener, including a key-bolt-receiving bolt, including a head section to receive at least one tool thereon, a rear cylindrical section disposed on at least a portion of the head section to extend a predetermined distance away from the head section, the rear cylindrical section including a key-bolt-receiving aperture disposed within at least a portion of the rear cylindrical section to receive an external fastener therein, and an internal thread section circumferentially disposed on an inner surface within the key-bolt-receiving aperture, and a key bolt to removably connect to at least a portion of the key-bolt-receiving bolt.

11 Claims, 11 Drawing Sheets

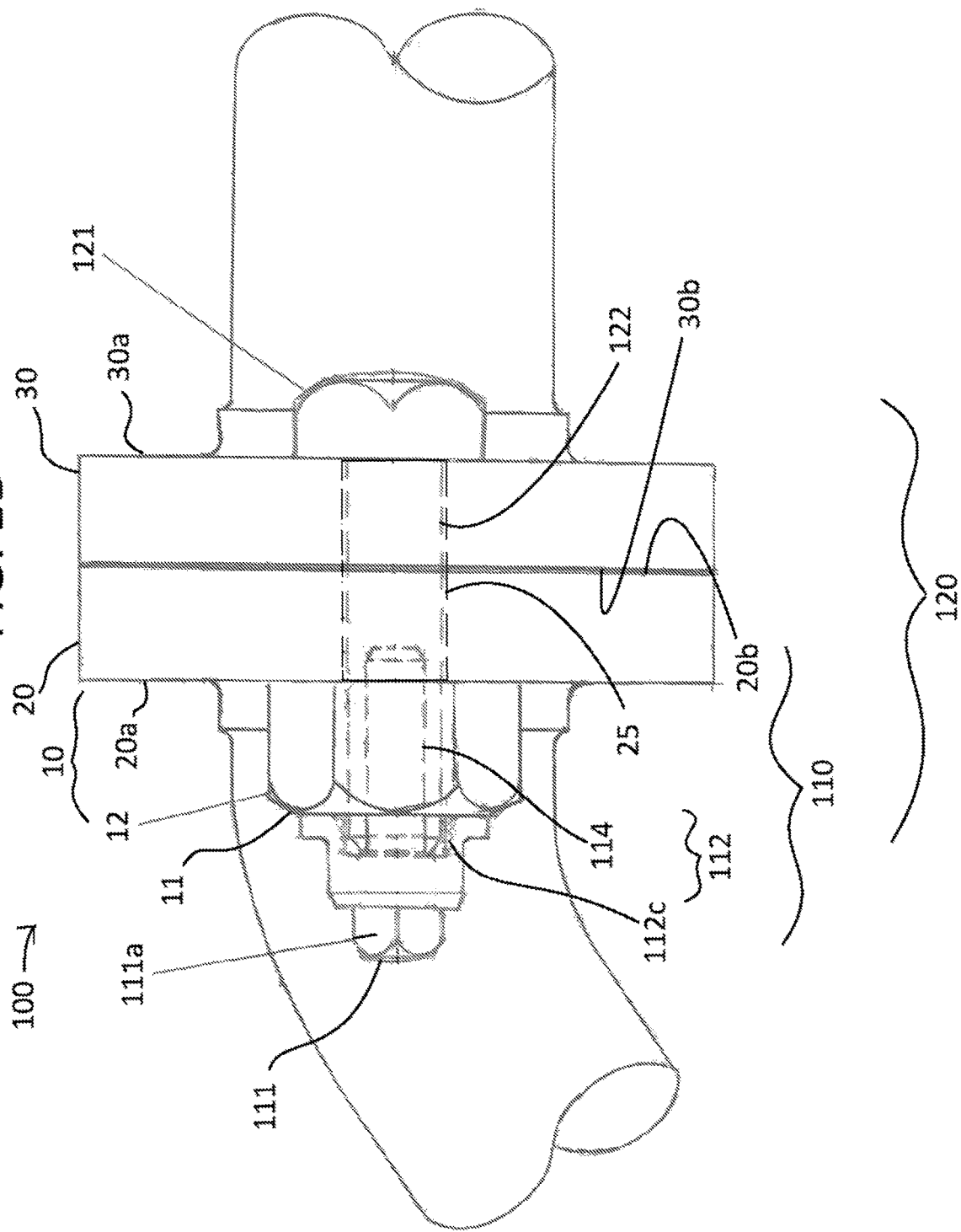

ANTI-LOOSENING FASTENER

BACKGROUND

1. Field

The present general inventive concept relates generally to a fastener, and particularly, to an anti-loosening fastener.

2. Description of the Related Art

A fastener is a mechanical device typically used to join two or more objects together. Nuts and bolts of all sizes, design, and material are manufactured by industries every day. The main purpose of a fastener is to attach one object to another. They are made according to engineering specifications and are used in various manufacturing industries, including consumer products, marine products, aerospace products, automotive products, and light products. In most applications, fasteners are required to be constructed from durable material. Furthermore, fasteners can function in very high or low temperatures and can dampen vibration.

A common use for fasteners is to secure a flange attachment, such that at least one bolt is inserted through an aperture on an end of a first flange that is aligned with an aperture on an end of a second flange, such that the at least one bolt extends through both apertures. Moreover, at least one nut is connected to the at least one bolt to secure the first flange to the second flange.

Unfortunately, the at least one bolt and the at least one nut are subject to failure problems including at least one of flange joint separation, flange joint slipping, flange prying, flange rotation, gasket leakage, shock, impact, thermal cycle, fatigue, vibration, and bolt and nut relaxation. In other words, many factors can contribute to a chance of the at least one bolt and the at least one nut becoming loose, such that the first flange and the second flange are no longer sealed. On a larger scale, these problems can result in issues such as liquid leaking from a pipe, a wind turbine collapse, or separation of railroad tracks.

Some solutions targeted to reduce loosening of the at least one bolt and the at least one nut include at least one of an adhesive applied in the threads of the nut and/or the bolt, a washer to improve clamp force, castellated nuts, and nylon inserted inside at least one nut.

Therefore, there is a need for a fastener that does not loosen over time.

SUMMARY

The present general inventive concept provides an anti-loosening fastener.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an anti-loosening fastener, including a key-bolt-receiving bolt, including a head section to receive at least one tool thereon, a rear cylindrical section disposed on at least a portion of the head section to extend a predetermined distance away from the head section, the rear cylindrical section including a key-bolt-receiving aperture disposed within at least a portion of the rear cylindrical section to receive an external fastener therein, and an internal thread section circumferentially disposed on an inner surface within the key-bolt-receiving aperture, and a key bolt to removably connect to at least a portion of the key-bolt-receiving bolt.

The key-bolt-receiving bolt may further include an external thread section circumferentially disposed on an outer surface of the key-bolt-receiving bolt to receive at least one other external fastener thereupon.

The key bolt may include a head portion, including a flange to support a weight of an external object thereupon, and a cylindrical surface disposed on at least a portion of a surface of the flange to receive at least a portion of the external thread section therein, and a rear cylindrical portion disposed on at least a portion of the head portion to extend another predetermined distance away from the head portion.

The cylindrical surface may include a knurled surface disposed on at least a portion of the cylindrical surface to facilitate gripping thereof, a bolt-receiving aperture disposed within at least a portion of the cylindrical surface to receive at least a portion of the key-bolt-receiving bolt therein, and another internal thread section circumferentially disposed on an inner surface within the bolt-receiving aperture to removably connect to the external thread section.

The rear cylindrical portion may include another external thread section circumferentially disposed on at least a portion of an outer surface of the rear cylindrical portion to removably connect to the internal thread section, such that the at least one other external fastener is prevented from moving.

A length of the internal thread section may be less than a length of the key-bolt-receiving aperture.

The foregoing and/or other features and utilities of the present general inventive concept may also be achieved by providing an anti-loosening fastener, including a key-bolt-receiving bolt, including a head section to receive at least one tool thereon, a rear cylindrical section disposed on at least a portion of the head section to extend a predetermined distance away from the head section, the rear cylindrical section including a shank section disposed on at least a portion of the key-bolt-receiving bolt, an external thread section circumferentially disposed on an outer surface of the key-bolt-receiving bolt near an end thereof to receive at least one other external fastener thereupon, a key-bolt-receiving aperture disposed within at least a portion of the key-bolt-receiving bolt to receive an external fastener therein, and an internal thread section circumferentially disposed on an inner surface within the key-bolt-receiving aperture, and a key bolt to removably connect to at least a portion of the key-bolt-receiving bolt.

The key bolt may include a head portion, including a flange to support a weight of an external object thereupon, and a cylindrical surface disposed on at least a portion of a surface of the flange to receive at least a portion of the external thread section therein, and a rear cylindrical portion disposed on at least a portion of the head portion to extend a predetermined distance away from the head portion.

The cylindrical surface may include a knurled surface disposed on at least a portion of the cylindrical surface to facilitate gripping thereof, a bolt-receiving aperture disposed within at least a portion of the cylindrical surface to receive at least a portion of the key-bolt-receiving bolt therein, and another internal thread section circumferentially disposed on an inner surface within the bolt-receiving aperture.

The rear cylindrical portion may include another external thread section circumferentially disposed on at least a portion of an outer surface of the rear cylindrical portion to removably connect to the internal thread section, such that the at least one other external fastener is prevented from moving.

A length of the internal thread section may be less than a length of the key-bolt-receiving aperture.

The foregoing and/or other features and utilities of the present general inventive concept may also be achieved by providing an anti-loosening fastener, including a key-bolt-receiving stud, including a first key-bolt-receiving aperture disposed within at least a portion of a first end of the key-bolt-receiving bolt to receive a first external fastener therein, and a second key-bolt-receiving aperture disposed within at least a portion of a second end of the key-bolt-receiving bolt to receive a second external fastener therein, and at least one key bolt to removably connect to at least a portion of the key-bolt-receiving bolt.

The key-bolt-receiving stud may further include a first internal thread section circumferentially disposed on an inner surface within the first key-bolt-receiving aperture, and a second internal thread section circumferentially disposed on an inner surface within the second key-bolt-receiving aperture.

The key-bolt-receiving stud may further include an external thread section circumferentially disposed on an outer surface of the key-bolt-receiving stud to receive at least one other external fastener thereupon.

The at least one key bolt may include a head portion, including a flange to support a weight of an external object thereupon, and a cylindrical surface disposed on at least a portion of a surface of the flange to receive at least a portion of the external thread section therein, and a rear cylindrical portion disposed on at least a portion of the head portion to extend a predetermined distance away from the head portion.

The cylindrical surface may include a knurled surface disposed on at least a portion of the cylindrical surface to facilitate gripping thereof, a bolt-receiving aperture disposed within at least a portion of the cylindrical surface to receive at least a portion of the key-bolt-receiving bolt therein, and another internal thread section circumferentially disposed on an inner surface within the bolt-receiving aperture to removably connect to the external thread section.

The rear cylindrical portion may include another external thread section circumferentially disposed on at least a portion of an outer surface of the rear cylindrical portion to removably connect to at least one of the first internal thread section or the second internal thread section, such that the at least one other external fastener is prevented from moving.

A length of the first internal thread section may be less than a length of the first key-bolt-receiving aperture.

A length of the second internal thread section may be less than a length of the second key-bolt-receiving aperture.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1B illustrates a side sectional view of the anti-loosening fastener as disposed within a first object and a second object, according to an exemplary embodiment of the present general inventive concept;

DETAILED DESCRIPTION

Figure 1A:
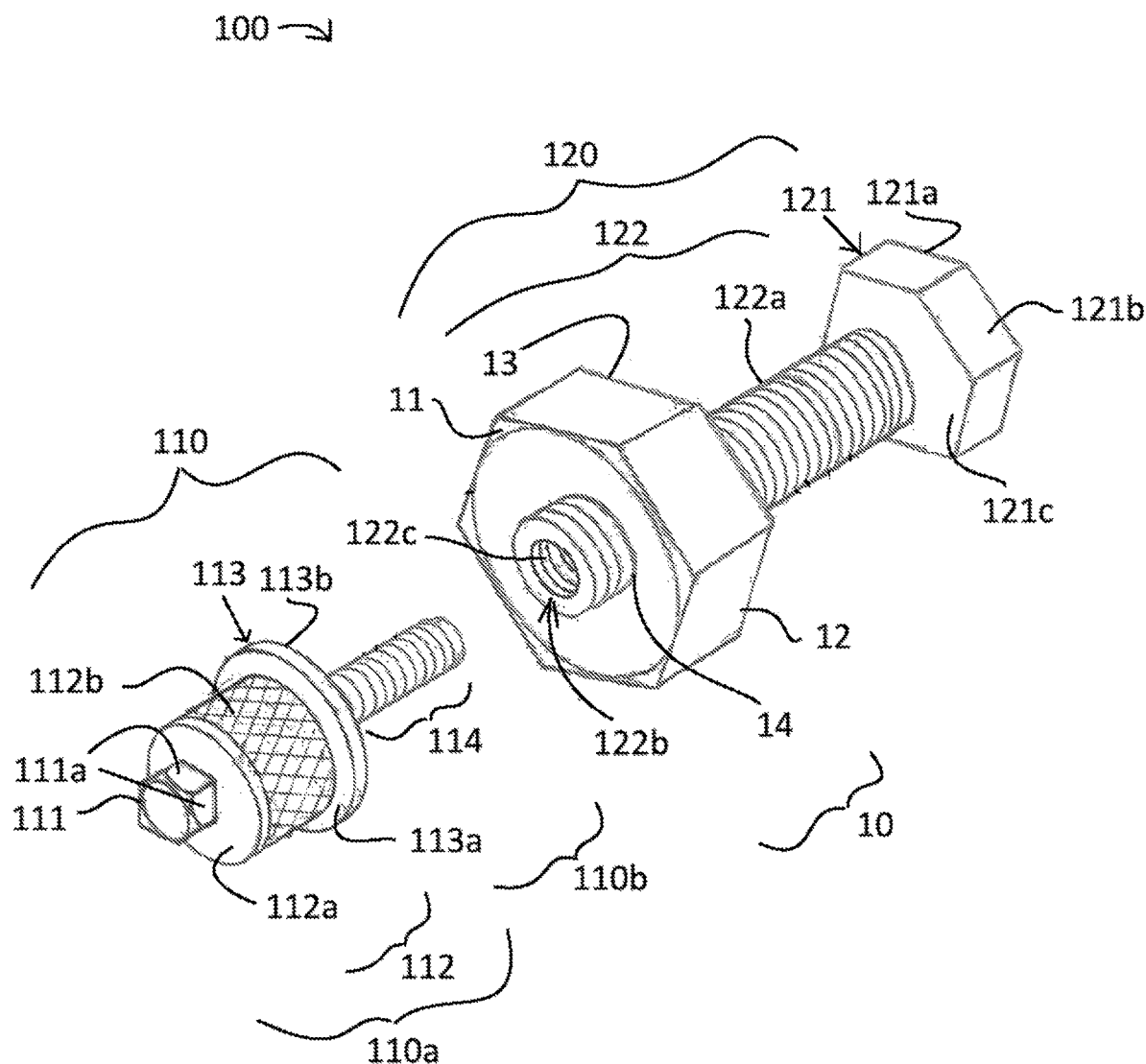
FIG. 1A illustrates an exploded view of an anti-loosening fastener, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Anti-Loosening Fastener 100
Key Bolt 110
Head Portion 110a
Rear Cylindrical Portion 110b
Key Nut 111
Hexagonal Surface 111a
Cylindrical Surface 112
Front Surface 112a
Knurled Surface 112b
Bolt-Receiving Aperture 112c
Internal Thread Section 112d
Flange 113
Front Surface 113a
Bearing Surface 113b
External Thread Section 114
Key-Bolt-Receiving Bolt 120
Head Section 121
Front Surface 121a
Hexagonal Surface 121b
Bearing Surface 121c
Rear Cylindrical Section 122
External Thread Section 122a
Key-Bolt-Receiving Aperture 122b
Internal Thread Section 122c
Anti-Loosening Fastener 200
Key-Bolt-Receiving Bolt 220
Head Section 222
Front Surface 221a
Hexagonal Surface 221b
Bearing Surface 221c
Rear Cylindrical Section 222
Shank Section 222a
External Thread Section 222b
Runout 222c
Key-Bolt-Receiving Aperture 222d
Internal Thread Section 222e
Anti-Loosening Fastener 300
Key-Bolt-Receiving Stud 320
External Thread Section 321
First End 321a
Second End 321b
First Key-Bolt-Receiving Aperture 322
First Internal Thread Section 322a
Second Key-Bolt-Receiving Aperture 323
Second Internal Thread Section 323a
Anti-Loosening Fastener 400
Key-Bolt-Receiving Stud 420
First Section 421
First External Thread Section 421a
First Runout 421b
First Key-Bolt-Receiving Aperture 421c
First Internal Thread Section 421d
Second Section 422
Second External Thread Section 422a
Second Runout 422b
Second Key-Bolt-Receiving Aperture 422c
Second Internal Thread Section 422d
Shank Section 423

FIG. 1A illustrates an exploded view of an anti-loosening fastener 100, according to an exemplary embodiment of the present general inventive concept.

FIG. 1B illustrates a side sectional view of the anti-loosening fastener 100 as disposed within a first object 20 and a second object 30, according to an exemplary embodiment of the present general inventive concept.

Figure 1C:
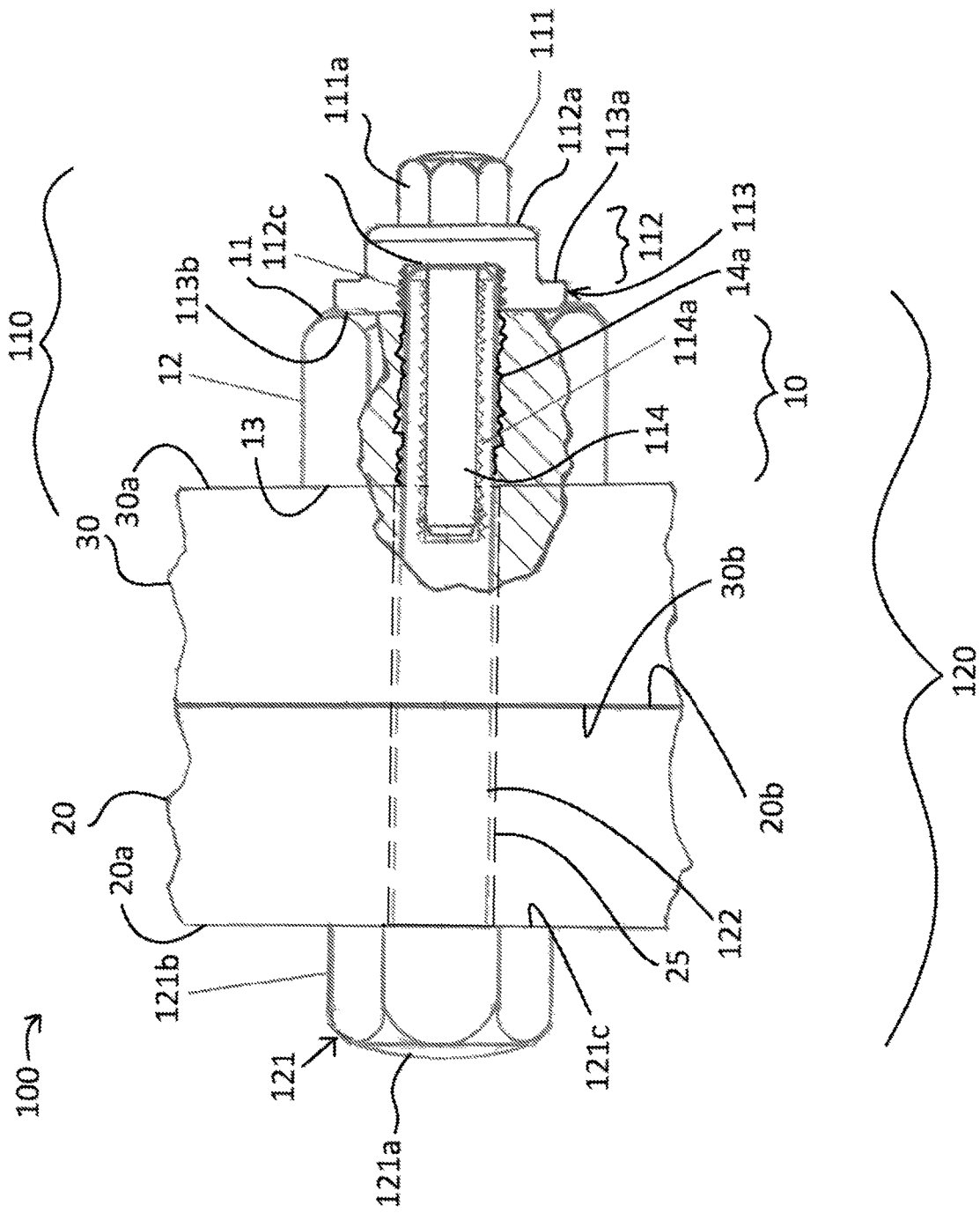
FIG. 1C illustrates a side sectional view of the anti-loosening fastener as disposed within the first object and the second object, according to an exemplary embodiment of the present general inventive concept.

FIG. 1C illustrates a side sectional view of the anti-loosening fastener 100 as disposed within the first object 20 and the second object 30, according to an exemplary embodiment of the present general inventive concept.

The anti-loosening fastener 100 may be constructed from at least one of metal, plastic, wood, and rubber, etc., but is not limited thereto. Moreover, the anti-loosening fastener 100 may be highly resistant to corrosion despite exposure to water.

The anti-loosening fastener 100 may include a key bolt 110 and a key-bolt-receiving bolt 120, but is not limited thereto.

Figure 2:
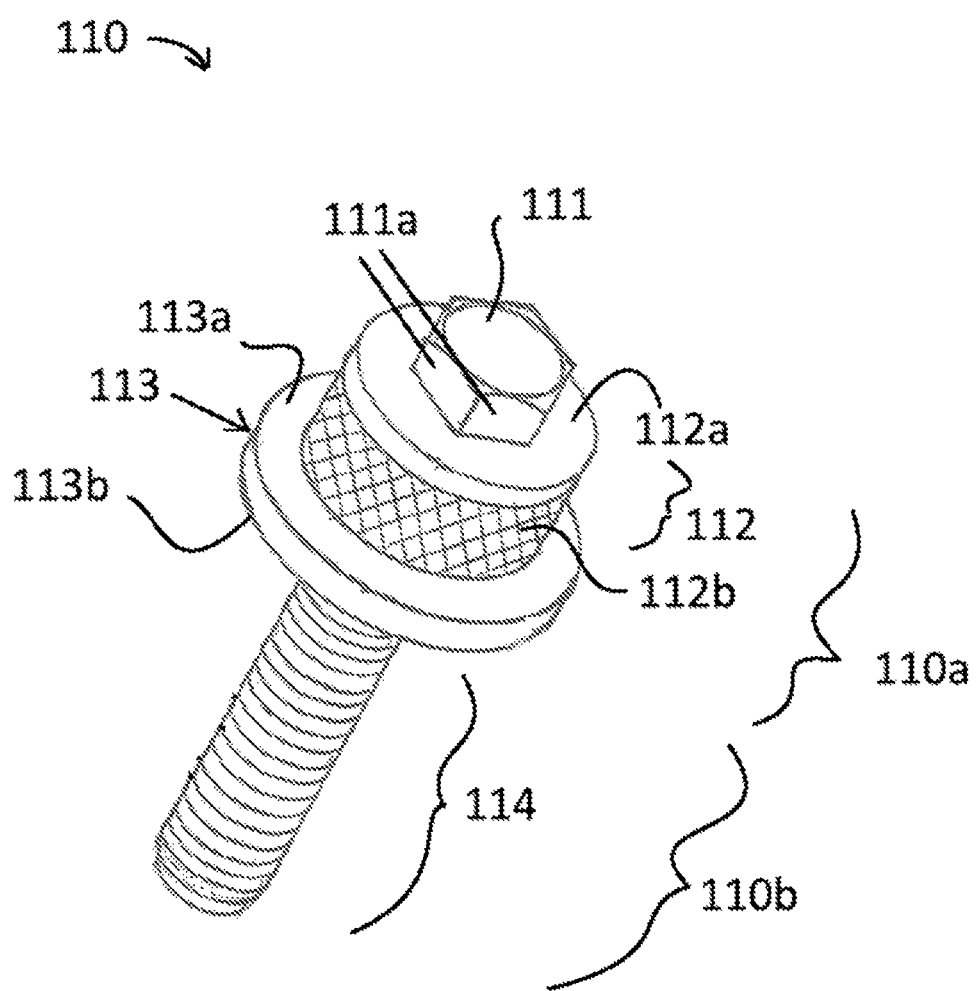
FIG. 2 illustrates a side perspective view of a key bolt, according to an exemplary embodiment of the present general inventive concept.

FIG. 2 illustrates a side perspective view of a key bolt 110, according to an exemplary embodiment of the present general inventive concept.

Although, the key bolt 110 is illustrated to be a bolt type fastener, the key bolt 110 may be at least one of a nail, a screw, a stud, a pin, a peg, a rivet, a threaded insert, and a threaded rod, etc., but is not limited thereto.

The key bolt 110 may include a head portion 110a and a rear cylindrical portion 110b, but is not limited thereto.

The head portion 110a may include a key nut 111, a cylindrical surface 112, and a flange 113, but is not limited thereto.

The key nut 111 may include a hexagonal surface 111a, but is not limited thereto.

Referring to FIGS. 1 through 2, the key nut 111 is illustrated to have a hexagonal shape. However, the key nut 111 may be rectangular, circular, pentagonal, octagonal, or any other shape known to one of ordinary skill in the art, but is not limited thereto. In other words, the hexagonal surface 111a may have a surface of a different shape.

The key nut 111 may be of any predetermined size. The hexagonal surface 111a may receive at least one of a socket wrench and a torque wrench thereupon, but is not limited thereto.

Referring to FIGS. 1A through 1C, the cylindrical surface 112 may include a front surface 112a, a knurled surface 112b, a bolt-receiving aperture 112c, and an internal thread section 112d, but is not limited thereto.

The front surface 112a of the cylindrical surface 112 may support at least one of the socket wrench and the torque wrench connected to the key nut 111. Moreover, the knurled surface 112b may be circumferentially disposed around at least a portion of the cylindrical surface 112. The knurled surface 112b may include a pattern of straight, angled, and/or crossed lines, but is not limited thereto. The knurled surface 112b may facilitate gripping by a user, such that the user may rotate the key bolt 110. Specifically, the knurled surface 112b may be a textured surface, which increases the friction between at least one finger of the user and the knurled surface 112b, such that the key bolt 110 may rotate in response to the user rotating the key bolt 110 in a first direction (i.e. clockwise) or a second direction (i.e. counterclockwise).

The bolt-receiving aperture 112c may be disposed within at least a portion of the cylindrical surface 112. The internal thread section 112d may be disposed on at least a portion of an inner surface within the bolt-receiving aperture 112c. The internal thread section 112d may be oriented in the first direction or the second direction.

The flange 113 may include a front surface 113a and a bearing surface 113b, but is not limited thereto.

The cylindrical surface 112 may be disposed on at least a portion of the front surface 113a of the flange 113.

The rear cylindrical portion 110b may include an external thread section 114, but is not limited thereto.

The rear cylindrical portion 110b may have a predetermined length based on the user's preferences. Moreover, a length of the external thread section 114 may extend at least a portion of the predetermined length of the rear cylindrical portion 110b.

Figure 3:
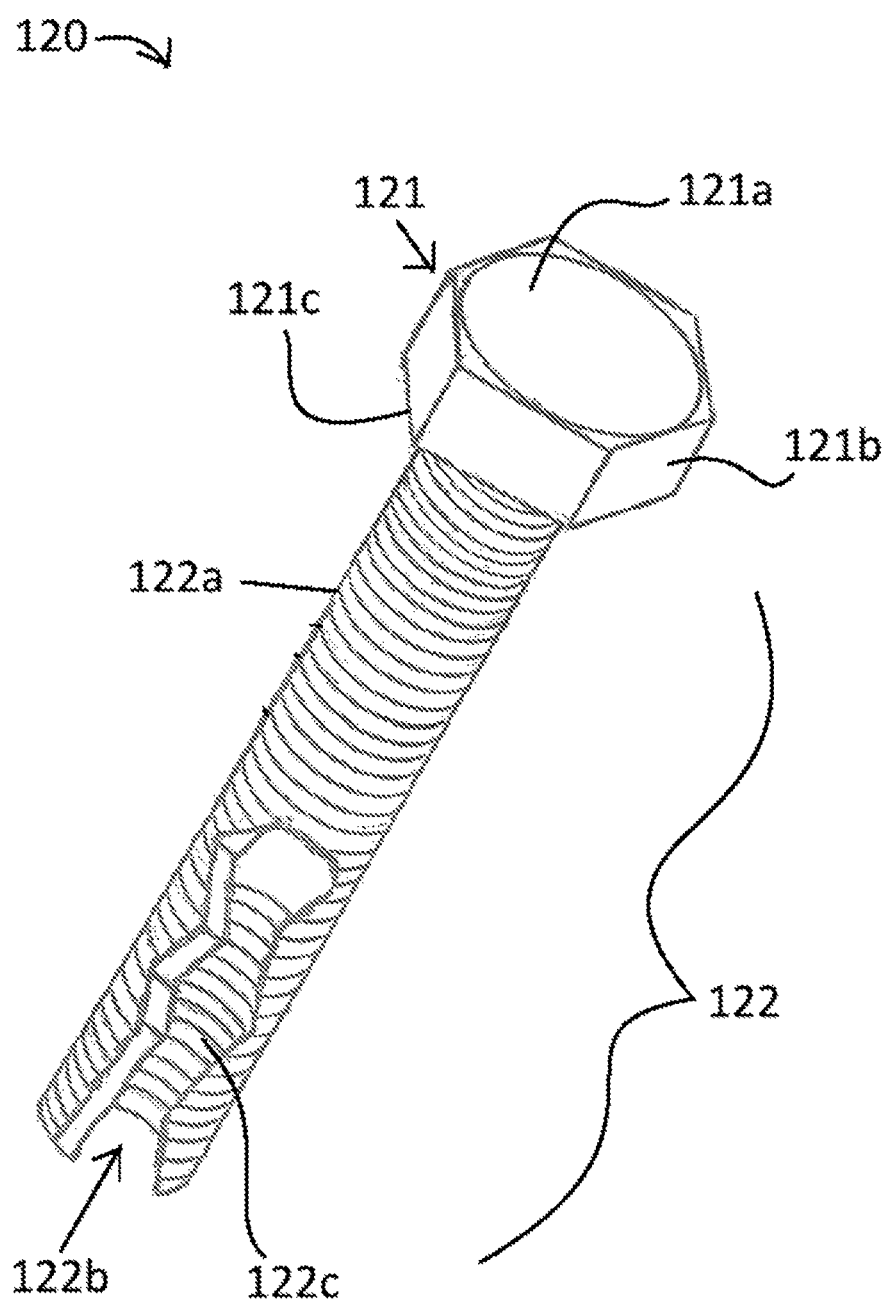
FIG. 3 illustrates a side perspective view of a key-bolt-receiving bolt including a sectional view of an internal thread section, according to an exemplary embodiment of the present general inventive concept.

FIG. 3 illustrates a side perspective view of a key-bolt-receiving bolt 120 including a sectional view of an internal thread section 122c, according to an exemplary embodiment of the present general inventive concept.

Although, the key-bolt-receiving bolt 120 is illustrated to be a bolt type fastener, the key-bolt-receiving bolt 120 may be at least one of a nail, a screw, a stud, a pin, a peg, a rivet, a threaded insert, and a threaded rod, etc., but is not limited thereto.

The key-bolt-receiving bolt 120 may include a head section 121 and a rear cylindrical section 122, but is not limited thereto.

The head section 121 may include a front surface 121a, a hexagonal surface 121b, and a bearing surface 121c, but is not limited thereto.

The head section 121 may be of any predetermined size. The front surface 121a and the hexagonal surface 121b may receive at least one of another socket wrench and another torque wrench thereupon, but is not limited thereto.

The rear cylindrical section 122 may include an external thread section 122a, a key-bolt-receiving aperture 122b, and an internal thread section 122c, but is not limited thereto.

The front surface 121a of the head section 121 may support at least one of the socket wrench and the torque wrench connected to the head section 121.

The rear cylindrical section 122 may have a predetermined length based on the user's preferences. Moreover, a length of the external thread section 122a may extend at least a portion of the predetermined length of the rear cylindrical section 122. The external thread section 122a may be oriented in the first direction or the second direction.

Referring to FIG. 3, the key-bolt-receiving aperture 122b may be disposed within at least a portion of the rear cylindrical section 122. Additionally, a length of the key-bolt-receiving aperture 122b may extend at least a portion of the predetermined length of the rear cylindrical section 122. The internal thread section 122c may be disposed on at least a portion of an inner surface within the key-bolt-receiving aperture 122b, such that a length of the internal thread section 122c may be less than the length of the key-bolt-receiving aperture 122b. The internal thread section 122c may be oriented in the first direction or the second direction.

Referring to FIGS. 1A through 1C, the anti-loosening fastener 100 may be used to affix and/or adhere a first object 20 to a second object 30. The first object 20 and the second object 30 may be arranged, such that at least a portion of a rear surface 20b of the first object 20 may be in substantial contact with at least a portion of a rear surface 30b of the second object 30. The key-bolt-receiving bolt 120 may be inserted into an aperture 25 that extends a distance through the first object 20 and the second object 30. More specifically, at least a portion of the rear cylindrical section 122 may be inserted into the aperture 25, such that movement of the key-bolt-receiving bolt 120 may terminate in response to the bearing surface 121c contacting a front surface 20a of the first object 20 or a front surface 30a of the second object 30.

An external fastener may be removably connected to the key-bolt-receiving bolt, such as a nut 10. The nut 10 may include a front surface 11, a hexagonal surface 12, a rear surface 13, and an aperture 14, but is not limited thereto.

Referring to FIG. 1C, the aperture 14 may include an internal thread section 14a, but is not limited thereto. The internal thread section 14a may be oriented in the first direction or the second direction.

A diameter of the aperture 14 of the nut 10 may be substantially the same as a diameter of the rear cylindrical section 122, such that the nut 10 may connect to the rear cylindrical section 122 by rotating the nut 10 thereon.

Subsequently, the user may grip at least a portion of the front surface 11, at least a portion of the hexagonal surface 12, and/or at least a portion of the rear surface 13 to connect the aperture 14 of the nut 10 to at least a portion of the rear cylindrical section 122. Specifically, the user may rotate the nut 10 around the rear cylindrical section 122 in the first direction or the second direction to interlock the internal thread section 14a of the nut 10 corresponding to the external thread section 122a of the key-bolt-receiving bolt 120. Moreover, the nut 10 may move toward the front surface 20a of the first object 20 or the front surface 30a of the second object 30 in response to the rotation in the first direction or the second direction. Additionally, the nut 10 may stop moving in response to the rear surface 13 of the nut 10 contacting the front surface 20a of the first object 20 or the front surface 30a of the second object 30.

Subsequently, the user may grip at least a portion of the knurling surface 112b of the key bolt 110 to move the key bolt 110 toward the key-bolt-receiving aperture 122b of the key-bolt-receiving bolt 120. A diameter of the rear cylindrical portion 110b may be substantially similar to a diameter of the key-bolt-receiving aperture 122b. Moreover, the rear cylindrical portion 110b may be inserted into the key-bolt-receiving aperture 122b. The user may rotate the key bolt 110 in the first direction or the second direction to interlock the external thread section 114 of the key bolt 110 corresponding to the internal thread section 122c of the key-bolt-receiving bolt 120. Alternatively, a torque wrench may be connected to at least a portion of the key nut 111 to rotate the key bolt 110. Additionally, the key bolt 110 may move toward the nut 10 in response to the rotation in the first direction or the second direction. The key bolt 110 may stop moving in response to the bearing surface 113b contacting the front surface 11 of the nut 10 and/or an end of the rear cylindrical section 122.

Also, at least a portion of the rear cylindrical section 122 of the key-bolt-receiving bolt 120 may penetrate within at least a portion of the bolt-receiving aperture 112c of the cylindrical surface 112. Specifically, the internal thread section 112d corresponding to the external thread section 122a of the key-bolt-receiving bolt 120 may interlock in response to the rotation of the rear cylindrical portion 110b of the key bolt 110 within the key-bolt-receiving aperture 122b of the key-bolt-receiving bolt 120.

As such, the key bolt 110 may prevent loosening of the nut 10 from the rear cylindrical section 122 of the key-bolt-receiving bolt 120 based on failure problems such as flange joint separation, flange joint slipping, flange prying, flange rotation, gasket leakage, shock, impact, thermal cycle, fatigue, vibration, and/or bolt and nut relaxation. In other words, the key bolt 110 may secure the nut 10 to the key-bolt-receiving bolt 120, such that the first object 20 and the second object 30 may remain connected.

Furthermore, anti-loosening fastener 100 may be used for a variety of flange types, such as a lap joint, a socket, a blind, a welding neck, a slip on, and threaded, but is not limited thereto. Also, the anti-loosening fastener 100 may be used in joint systems for at least one of a railway suspension system, a tractor front axle suspension system, a plurality of piping flanges, a system in petroleum, refineries, and chemical and processing industries.

Figure 4:
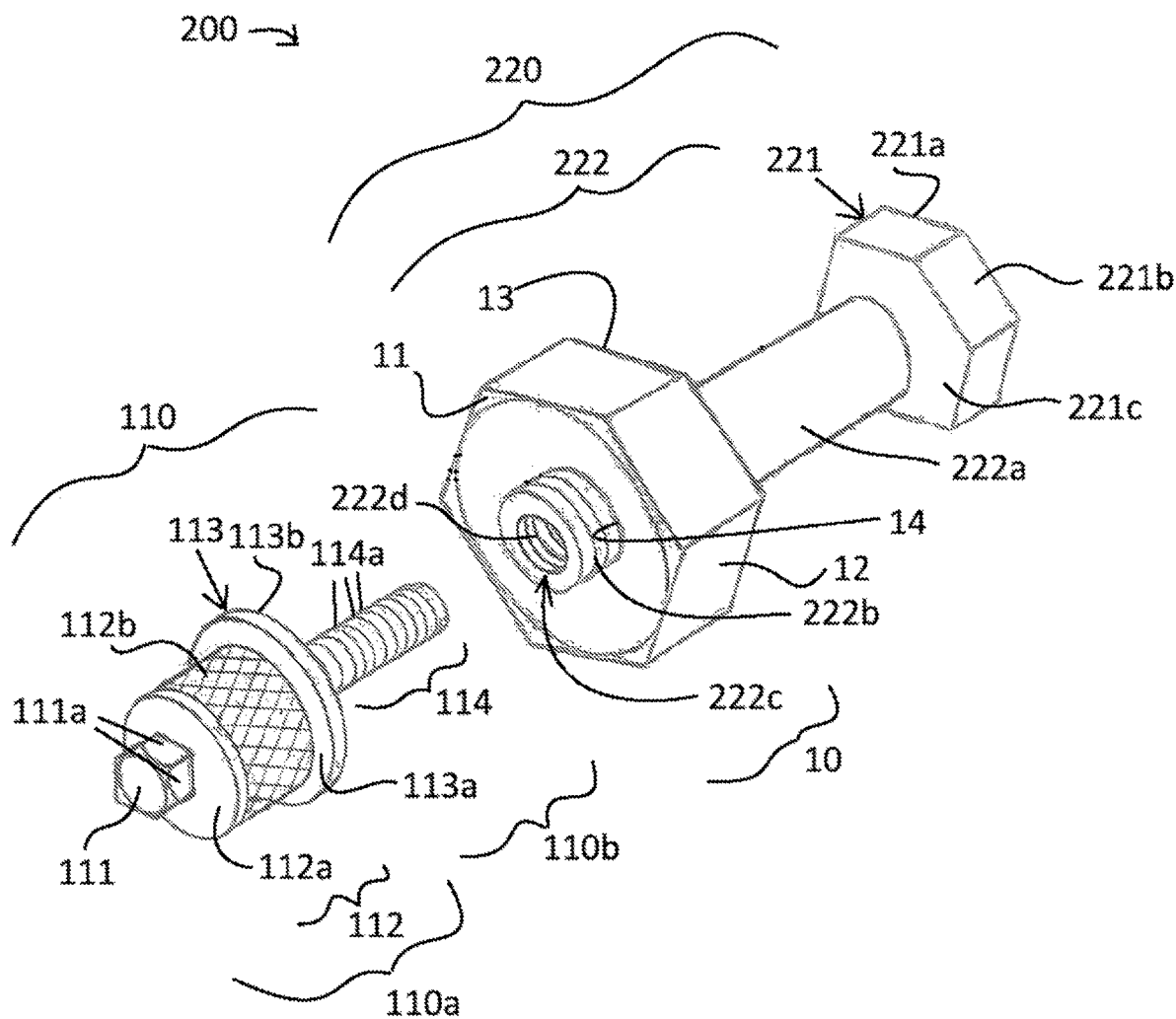
FIG. 4 illustrates an exploded view of an anti-loosening fastener, according to another exemplary embodiment of the present general inventive concept.

FIG. 4 illustrates an exploded view of an anti-loosening fastener 200, according to another exemplary embodiment of the present general inventive concept.

The anti-loosening fastener 200 may be constructed from at least one of metal, plastic, wood, and rubber, etc., but is not limited thereto. Moreover the anti-loosening fastener 200 may be highly resistant to corrosion despite exposure to water.

The anti-loosening fastener 200 may include a key bolt 110 and a key-bolt-receiving bolt 220, but is not limited thereto.

Figure 5:
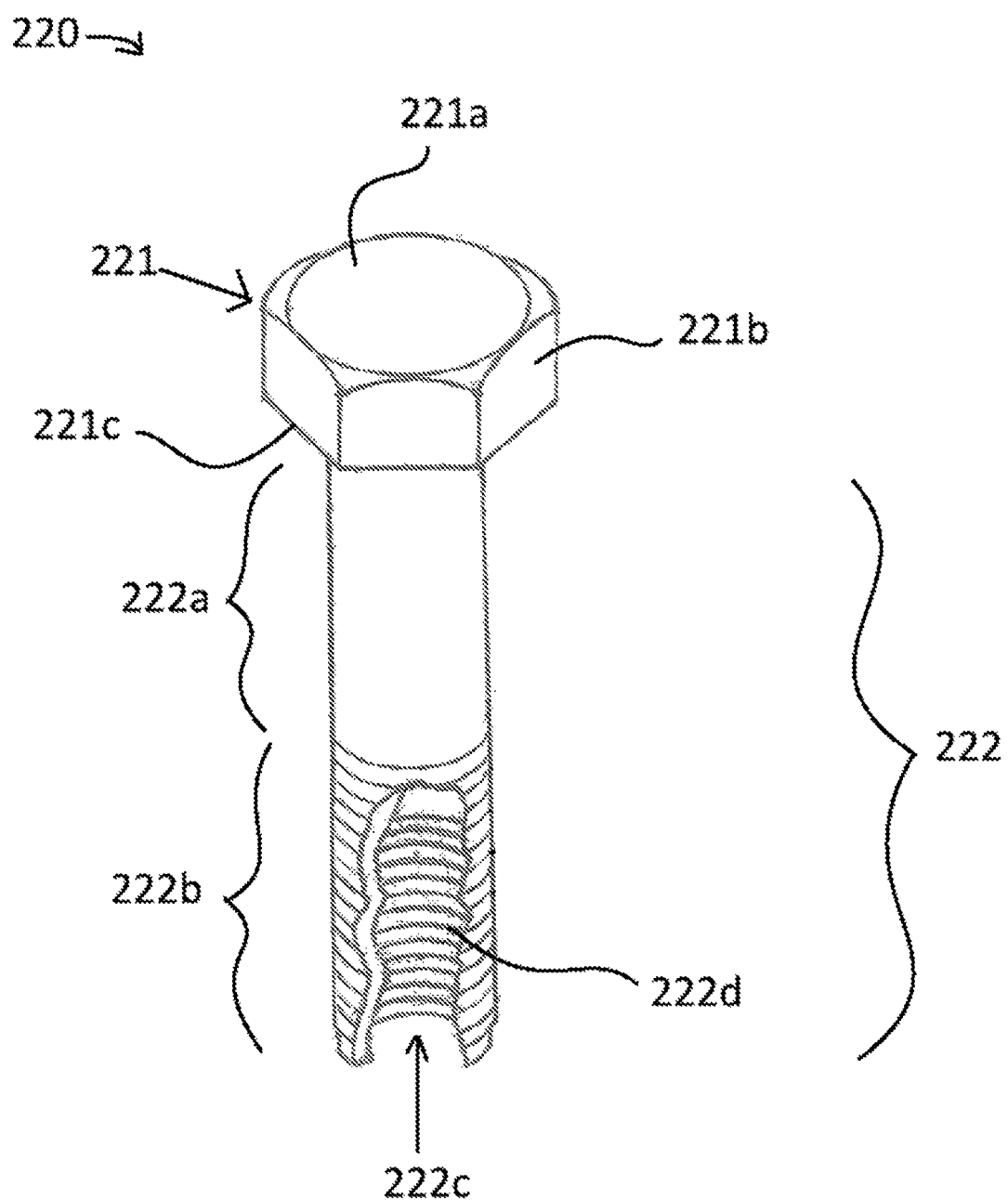
FIG. 5 illustrates a side perspective view of a key-bolt-receiving bolt including a sectional view of an internal thread section, according to an exemplary embodiment of the present general inventive concept.

FIG. 5 illustrates a side perspective view of a key-bolt-receiving bolt 220 including a sectional view of an internal thread section 222e, according to an exemplary embodiment of the present general inventive concept.

Although, the key-bolt-receiving bolt 220 is illustrated to be a bolt type fastener, the key-bolt-receiving bolt 220 may be at least one of a nail, a screw, a stud, a pin, a peg, a rivet, a threaded insert, and a threaded rod, etc., but is not limited thereto.

The key-bolt-receiving bolt 220 may include a head section 222 and a rear cylindrical section 222, but is not limited thereto.

The head section 222 may include a front surface 221a, a hexagonal surface 221b, and a bearing surface 221c, but is not limited thereto.

The head section 222 may be of any predetermined size. The front surface 221a and the hexagonal surface 221b may receive at least one of the another socket wrench and the another torque wrench thereupon, but is not limited thereto.

The rear cylindrical section 222 may include a shank section 222a, an external thread section 222b, a runout 222c, a key-bolt-receiving aperture 222d, and an internal thread section 222e, but is not limited thereto.

The front surface 221a of the head section 222 may support at least one of the socket wrench and the torque wrench connected to the head section 222.

The rear cylindrical section 222 may have a predetermined length based on the user's preferences. Moreover, a length of the shank section 222a may extend at least a portion of the predetermined length of the rear cylindrical section 222 beginning at the head section 222 and terminating at the runout 222c. Also, a length of the external thread section 222b may extend at least a portion of the predetermined length of the rear cylindrical section 222 beginning at the runout 222c and terminating at an end of the rear cylindrical section 222. The external thread section 222b may be oriented in the first direction or the second direction.

Referring to FIG. 5, the key-bolt-receiving aperture 222d may be disposed within at least a portion of the rear cylindrical section 222. Additionally, a length of the key-bolt-receiving aperture 222d may extend at least a portion of the predetermined length of the rear cylindrical section 222. The internal thread section 222e may be disposed on at least a portion of an inner surface within the key-bolt-receiving aperture 222d, such that a length of the internal thread section 222e may be less than the length of the key-bolt-receiving aperture 222d. The internal thread section 222e may be oriented in the first direction or the second direction.

Referring to FIGS. 1A through 1C, the anti-loosening fastener 200 may be used to affix and/or adhere the first object 20 to the second object 30. The first object 20 and the second object 30 may be arranged, such that at least a portion of the rear surface 20b of the first object 20 may be in substantial contact with at least a portion of the rear surface 30b of the second object 30. The key-bolt-receiving bolt 220 may be inserted into the aperture 25 that extends the distance through the first object 20 and the second object 30. More specifically, at least a portion of the rear cylindrical section 222 may be inserted into the aperture 25, such that movement of the key-bolt-receiving bolt 220 may terminate in response to the bearing surface 221c contacting the front surface 20a of the first object 20 or the front surface 30a of the second object 30.

The diameter of the aperture 14 of the nut 10 may be substantially the same as a diameter of the rear cylindrical section 222, such that the nut 10 may connect to the rear cylindrical section 222 by rotating the nut 10 thereon.

Subsequently, the user may grip at least a portion of the front surface 11, at least a portion of the hexagonal surface 12, and/or at least a portion of the rear surface 13 to connect the aperture 14 of the nut 10 to at least a portion of the rear cylindrical section 222. Specifically, the user may rotate the nut 10 around the rear cylindrical section 222 in the first direction or the second direction to interlock the internal thread section 14a of the nut 10 corresponding to the external thread section 222b of the key-bolt-receiving bolt 220. Moreover, the nut 10 may move toward the front surface 20a of the first object 20 or the front surface 30a of the second object 30 in response to the rotation in the first direction or the second direction. Additionally, the nut 10 may stop moving in response to the rear surface 13 of the nut 10 contacting the runout 222c of the rear cylindrical section 222, the front surface 20a of the first object 20, and/or the front surface 30a of the second object 30. In other words, the runout 222c may prevent the nut 10 from moving along the shank section 222a.

Subsequently, the user may grip at least a portion of the knurling surface 112b of the key bolt 110 to move the key bolt 110 toward the key-bolt-receiving aperture 222d of the key-bolt-receiving bolt 220. A diameter of the rear cylindrical portion 110b of the key bolt 110 may be substantially similar to a diameter of the key-bolt-receiving aperture 222d. Moreover, the rear cylindrical portion 110b may be inserted into the key-bolt-receiving aperture 222d. The user may rotate the key bolt 110 in the first direction or the second direction to interlock the external thread section 114 of the key bolt 110 corresponding to the internal thread section 222e of the key-bolt-receiving bolt 220. Alternatively, a torque wrench may be connected to at least a portion of the key nut 111 to rotate the key bolt 110. Additionally, the key bolt 110 may move toward the nut 10 in response to the rotation in the first direction or the second direction. The key bolt 110 may stop moving in response to the bearing surface 113b contacting the front surface 11 of the nut 10 and/or an end of the rear cylindrical section 222.

Also, at least a portion of the rear cylindrical section 222 of the key-bolt-receiving bolt 220 may penetrate within at least a portion of the bolt-receiving aperture 112c of the cylindrical surface 112. Specifically, the internal thread section 112d corresponding to the external thread section 222b of the key-bolt-receiving bolt 220 may interlock in response to the rotation of the rear cylindrical portion 110b of the key bolt 110 within the key-bolt-receiving aperture 222d of the key-bolt-receiving bolt 220.

As such, the key bolt 110 may prevent loosening of the nut 10 from the rear cylindrical section 222 of the key-bolt-receiving bolt 220 based on failure problems such as flange joint separation, flange joint slipping, flange prying, flange rotation, gasket leakage, shock, impact, thermal cycle, fatigue, vibration, and/or bolt and nut relaxation. In other words, the key bolt 110 may secure the nut 10 to the key-bolt-receiving bolt 220, such that the first object 20 and the second object 30 may remain connected.

Furthermore, anti-loosening fastener 200 may be used for a variety of flange types, such as a lap joint, a socket, a blind, a welding neck, a slip on, and threaded, but is not limited thereto. Also, the anti-loosening fastener 200 may be used in joint systems for at least one of a railway suspension system, a tractor front axle suspension system, a plurality of piping flanges, a system in petroleum, refineries, and chemical and processing industries.

Figure 6:
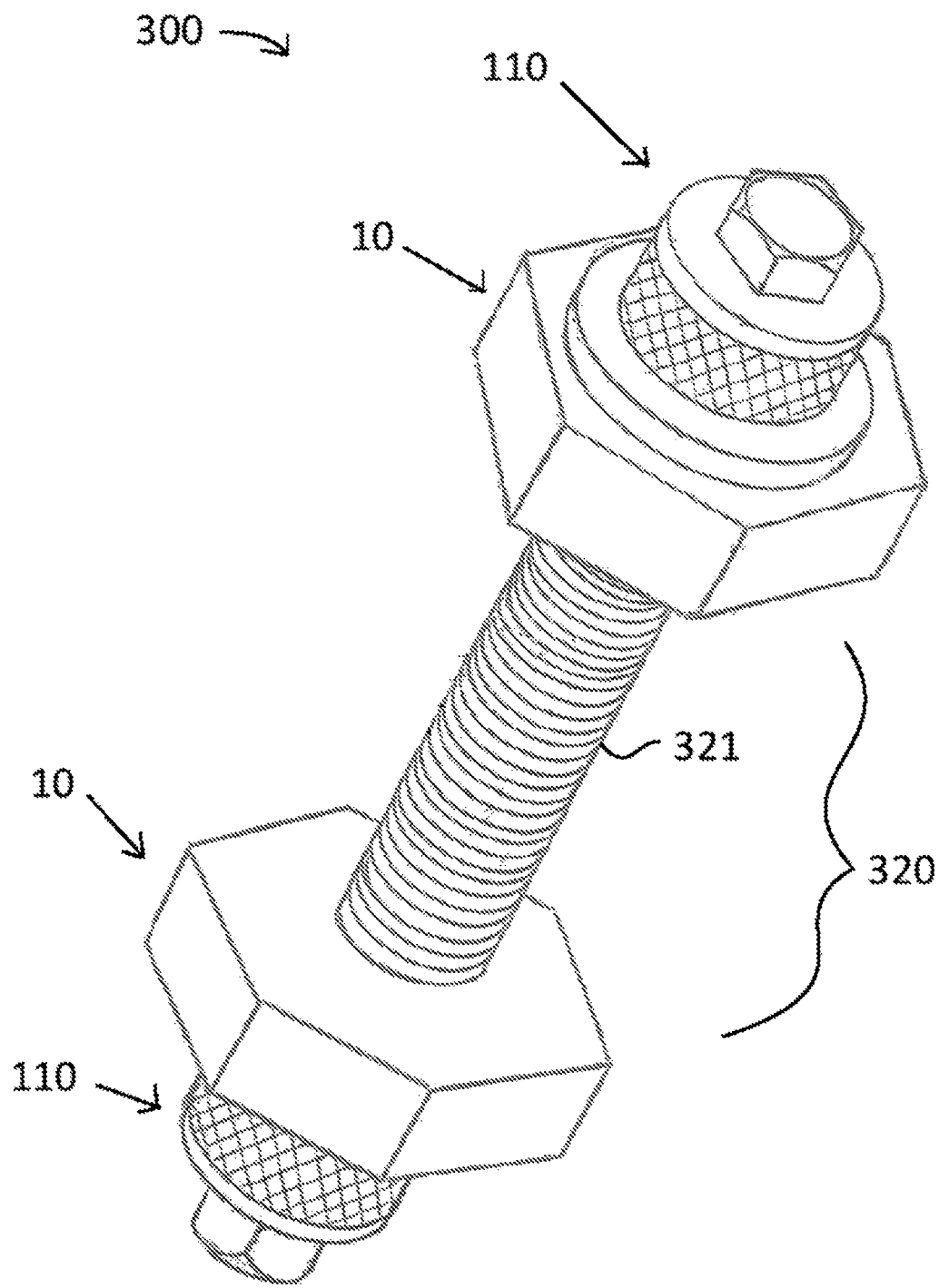
FIG. 6 illustrates a side perspective view of an anti-loosening fastener, according to another exemplary embodiment of the present general inventive concept.

FIG. 6 illustrates a side perspective view of an anti-loosening fastener 300, according to another exemplary embodiment of the present general inventive concept.

The anti-loosening fastener 300 may be constructed from at least one of metal, plastic, wood, and rubber, etc., but is not limited thereto. Moreover the anti-loosening fastener 300 may be highly resistant to corrosion despite exposure to water.

The anti-loosening fastener 300 may include at least one key bolt 110 and a key-bolt-receiving stud 320, but is not limited thereto.

Figure 7:
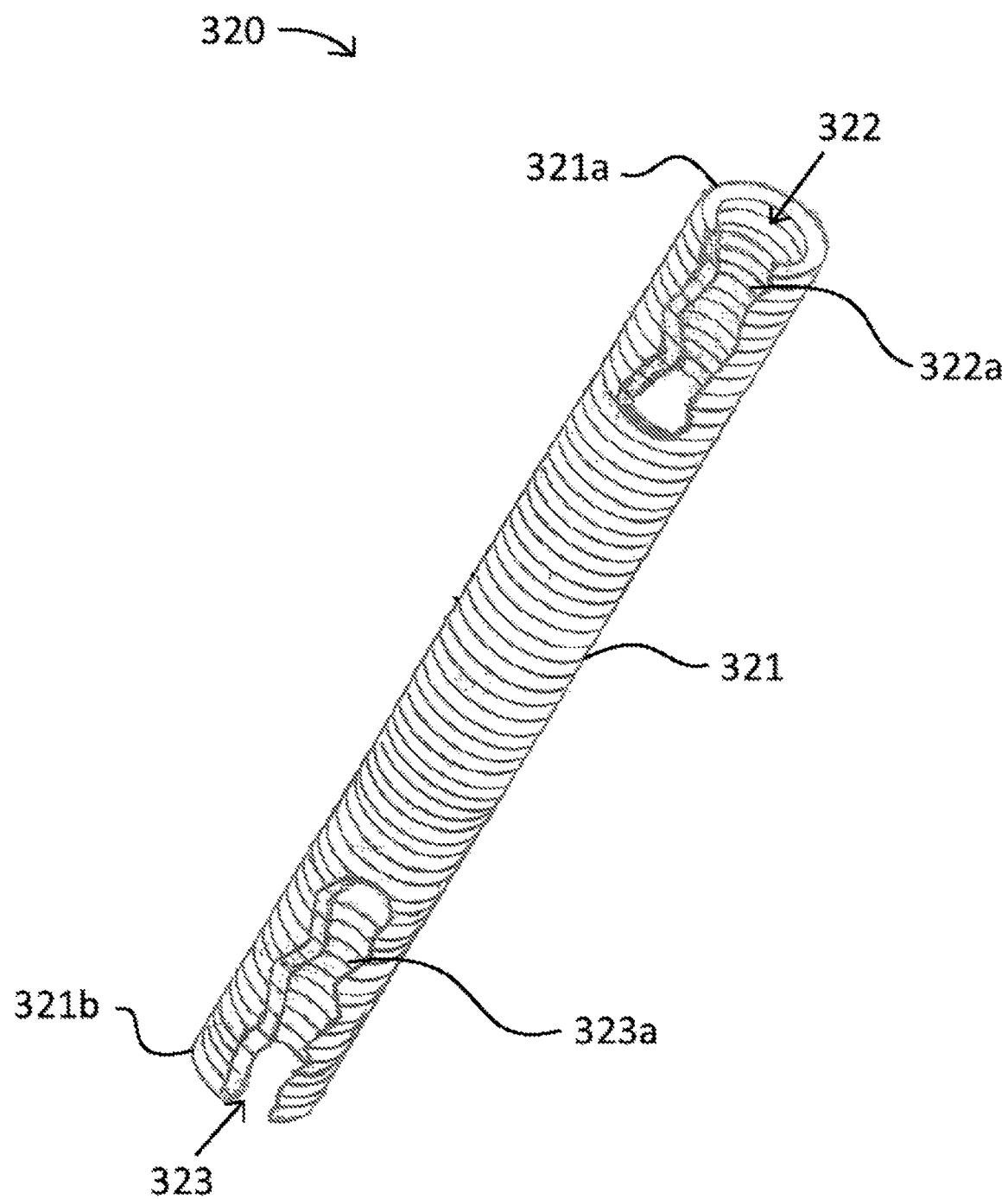
FIG. 7 illustrates a side perspective view of a key-bolt-receiving stud including a sectional view of a first internal thread section and a second internal thread section, according to another exemplary embodiment of the present general inventive concept.

FIG. 7 illustrates a side perspective view of a key-bolt-receiving stud 320 including a sectional view of a first internal thread section 322a and a second internal thread section 323a, according to another exemplary embodiment of the present general inventive concept.

Although, the key-bolt-receiving stud 320 is illustrated to be a stud type fastener, the key-bolt-receiving stud 320 may be at least one of a bolt, a nail, a screw, a pin, a peg, a rivet, a threaded insert, and a threaded rod, etc., but is not limited thereto.

The key-bolt-receiving stud 320 may include a first end 320a, a second end 320b, an external thread section 321, a first key-bolt-receiving aperture 322, and a second key-bolt-receiving aperture 323, but is not limited thereto.

The first key-bolt-receiving aperture 322 may include a first internal thread section 322a, but is not limited thereto.

The second key-bolt-receiving aperture 323 may include a second internal thread section 323a, but is not limited thereto.

The key-bolt-receiving stud 320 may have a predetermined length based on the user's preferences. Moreover, a length of the external thread section 321 may extend at least a portion of the predetermined length of the key-bolt-receiving stud 320 beginning at the first end 320a and terminating at the second end 320b. The external thread section 321 may be oriented in the first direction or the second direction.

Referring to FIG. 7, the first key-bolt-receiving aperture 322 may be disposed within at least a portion of the first end 320a of the key-bolt-receiving stud 320. Additionally, a length of the first key-bolt-receiving aperture 322 may extend at least a portion of the predetermined length of the key-bolt-receiving stud 320. The first internal thread section 322a may be disposed on at least a portion of an inner surface within the first key-bolt-receiving aperture 322, such that a length of the first internal thread section 322a may be less than the length of the first key-bolt-receiving aperture 322. The first internal thread section 322 may be oriented in the first direction or the second direction.

Also, the second key-bolt-receiving aperture 323 may be disposed within at least a portion of the second end 320b of the key-bolt-receiving stud 320. Additionally, a length of the second key-bolt-receiving aperture 323 may extend at least a portion of the predetermined length of the key-bolt-receiving stud 320. The second internal thread section 323a may be disposed on at least a portion of an inner surface within the second key-bolt-receiving aperture 323, such that a length of the second internal thread section 323a may be less than the length of the second key-bolt-receiving aperture 323. The second internal thread section 323 may be oriented in the first direction or the second direction.

Referring to FIG. 6, the anti-loosening fastener 300 may be used to affix and/or adhere at least one object to at least one other object. The key-bolt-receiving stud 320 may be inserted into an aperture that extends a distance through the at least one object and the at least one other object, such that at least a portion of the first end 320a protrudes from the aperture of the at least one object and the second end 320b protrudes from the aperture of the at least one other object.

The diameter of the aperture 14 of the nut 10 may be substantially the same as a diameter of the key-bolt-receiving stud 320, such that the nut 10 may connect to the key-bolt-receiving stud 320 by rotating the nut 10 thereon.

Subsequently, the user may grip at least a portion of the front surface 11, at least a portion of the hexagonal surface 12, and/or at least a portion of the rear surface 13 to connect the aperture 14 of the nut 10 to at least a portion of the external thread section 321 substantially near the first end 320a. Specifically, the user may rotate the nut 10 around the external thread section 321 in the first direction or the second direction to interlock the internal thread section 14a of the nut 10 corresponding to the external thread section 321 substantially near the first end 320a of the key-bolt-receiving stud 320. Moreover, the nut 10 may move toward a center of the key-bolt-receiving stud 320 in response to the rotation in the first direction or the second direction. Additionally, the nut 10 may stop moving in response to the rear surface 13 of the nut 10 contacting at least a portion of the at least one object.

Subsequently, the user may grip at least a portion of the knurling surface 112b of the at least one key bolt 110 to move the at least one key bolt 110 toward the first key-bolt-receiving aperture 322 of the key-bolt-receiving stud 320. A diameter of the rear cylindrical portion 110b may be substantially similar to a diameter of the first key-bolt-receiving aperture 322. Moreover, the rear cylindrical portion 110b may be inserted into the first key-bolt-receiving aperture 322. The user may rotate the at least one key bolt 110 in the first direction or the second direction to interlock the external thread section 114 of the at least one key bolt 110 corresponding to the first internal thread section 322a of the key-bolt-receiving stud 320. Alternatively, a torque wrench may be connected to at least a portion of the key nut 111 to rotate the at least one key bolt 110. Additionally, the at least one key bolt 110 may move toward the nut 10 in response to the rotation in the first direction or the second direction. The at least one key bolt 110 may stop moving in response to the bearing surface 113*b* contacting the front surface 11 of the nut 10 and/or the first end 320*a* of the key-bolt-receiving stud 320.

Also, at least a portion of the external thread section 321 substantially near the first end 320*a* of the key-bolt-receiving stud 320 may penetrate within at least a portion of the bolt-receiving aperture 112*c* of the cylindrical surface 112. Specifically, the internal thread section 112*d* corresponding to the external thread section 321 substantially near the first end 320*a* of the key-bolt-receiving stud 320 may interlock in response to the rotation of the rear cylindrical portion 110*b* of the at least one key bolt 110 within the first key-bolt-receiving aperture 322 of the key-bolt-receiving stud 320.

As such, the at least one key bolt 110 may prevent loosening of the nut 10 from the first end 320*a* of the key-bolt-receiving stud 320 based on failure problems such as flange joint separation, flange joint slipping, flange prying, flange rotation, gasket leakage, shock, impact, thermal cycle, fatigue, vibration, and/or bolt and nut relaxation. In other words, the at least one key bolt 110 may secure the nut 10 to the key-bolt-receiving stud 320, such that the at least one object and the at least one other object may remain connected.

Similarly, the user may grip at least a portion of a front surface 11, at least a portion of a hexagonal surface 12, and/or at least a portion of a rear surface 13 to connect an aperture 14 of another nut 10 to at least a portion of the external thread section 321 substantially near the second end 320*b*. Specifically, the user may rotate the another nut 10 around the external thread section 321 in the first direction or the second direction to interlock the internal thread section 14*a* of the another nut 10 corresponding to the external thread section 321 substantially near the second end 320*b* of the key-bolt-receiving stud 320. Moreover, the another nut 10 may move toward the center of the key-bolt-receiving stud 320 in response to the rotation in the first direction or the second direction. Additionally, the another nut 10 may stop moving in response to the rear surface 13 of the another nut 10 contacting at least a portion of the at least one other object.

Subsequently, the user may grip at least a portion of a knurling surface 112*b* of another at least one key bolt 110 to move the another at least one key bolt 110 toward the second key-bolt-receiving aperture 323 of the key-bolt-receiving stud 320. A diameter of the rear cylindrical portion 110*b* may be substantially similar to a diameter of the second key-bolt-receiving aperture 323. Moreover, the rear cylindrical portion 110*b* may be inserted into the second key-bolt-receiving aperture 323. The user may rotate the another at least one key bolt 110 in the first direction or the second direction to interlock the external thread section 114 of the another at least one key bolt 110 corresponding to the second internal thread section 323*a* of the key-bolt-receiving stud 320. Alternatively, a torque wrench may be connected to at least a portion of the key nut 111 to rotate the another at least one key bolt 110. Additionally, the another at least one key bolt 110 may move toward the another nut 10 in response to the rotation in the first direction or the second direction. The another at least one key bolt 110 may stop moving in response to the bearing surface 113*b* contacting the front surface 11 of the another nut 10 and/or the second end 320*b* of the key-bolt-receiving stud 320.

Also, at least a portion of the external thread section 321 substantially near the second end 320*b* of the key-bolt-receiving stud 320 may penetrate within at least a portion of the bolt-receiving aperture 112*c* of the cylindrical surface 112. Specifically, the internal thread section 112*d* corresponding to the external thread section 321 substantially near the second end 320*b* of the key-bolt-receiving stud 320 may interlock in response to the rotation of the rear cylindrical portion 110*b* of the key bolt 110 within the second key-bolt-receiving aperture 323 of the key-bolt-receiving stud 320.

As such, the another at least one key bolt 110 may prevent loosening of the another nut 10 from the second end 320*b* of the key-bolt-receiving stud 320 based on failure problems such as flange joint separation, flange joint slipping, flange prying, flange rotation, gasket leakage, shock, impact, thermal cycle, fatigue, vibration, and/or bolt and nut relaxation. In other words, the another at least one key bolt 110 may secure the another nut 10 to the key-bolt-receiving stud 320, such that the at least one object and the at least one other object may remain connected.

Furthermore, anti-loosening fastener 300 may be used for a variety of flange types, such as a lap joint, a socket, a blind, a welding neck, a slip on, and threaded, but is not limited thereto. Also, the anti-loosening fastener 300 may be used in joint systems for at least one of a railway suspension system, a tractor front axle suspension system, a plurality of piping flanges, a system in petroleum, refineries, and chemical and processing industries.

Figure 8:
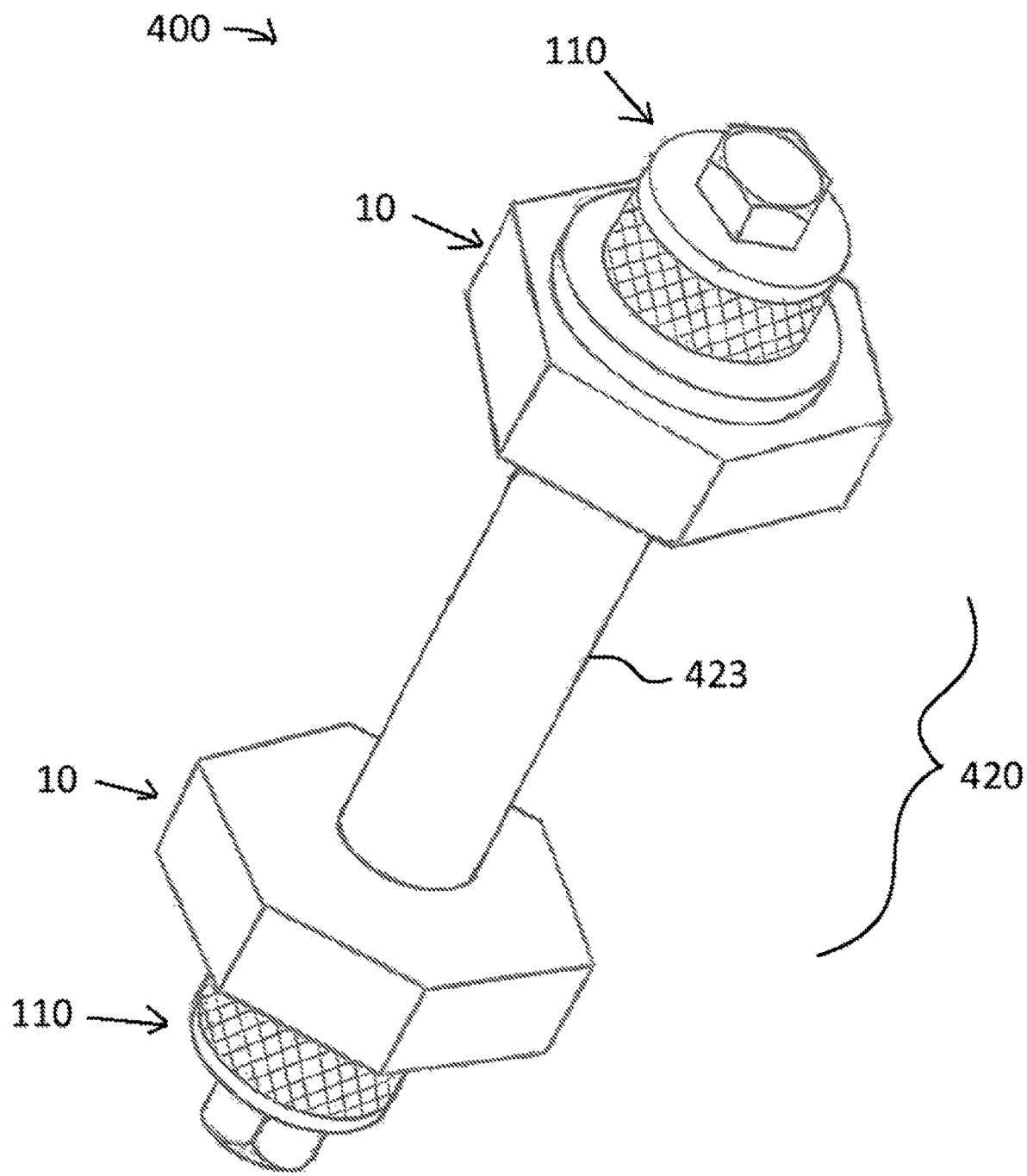
FIG. 8 illustrates a side perspective view of an anti-loosening fastener, according to another exemplary embodiment of the present general inventive concept.

FIG. 8 illustrates a side perspective view of an anti-loosening fastener 400, according to another exemplary embodiment of the present general inventive concept.

The anti-loosening fastener 400 may be constructed from at least one of metal, plastic, wood, and rubber, etc., but is not limited thereto. Moreover the anti-loosening fastener 400 may be highly resistant to corrosion despite exposure to water.

The anti-loosening fastener 400 may include at least one key bolt 110 and a key-bolt-receiving stud 420, but is not limited thereto.

Figure 9:
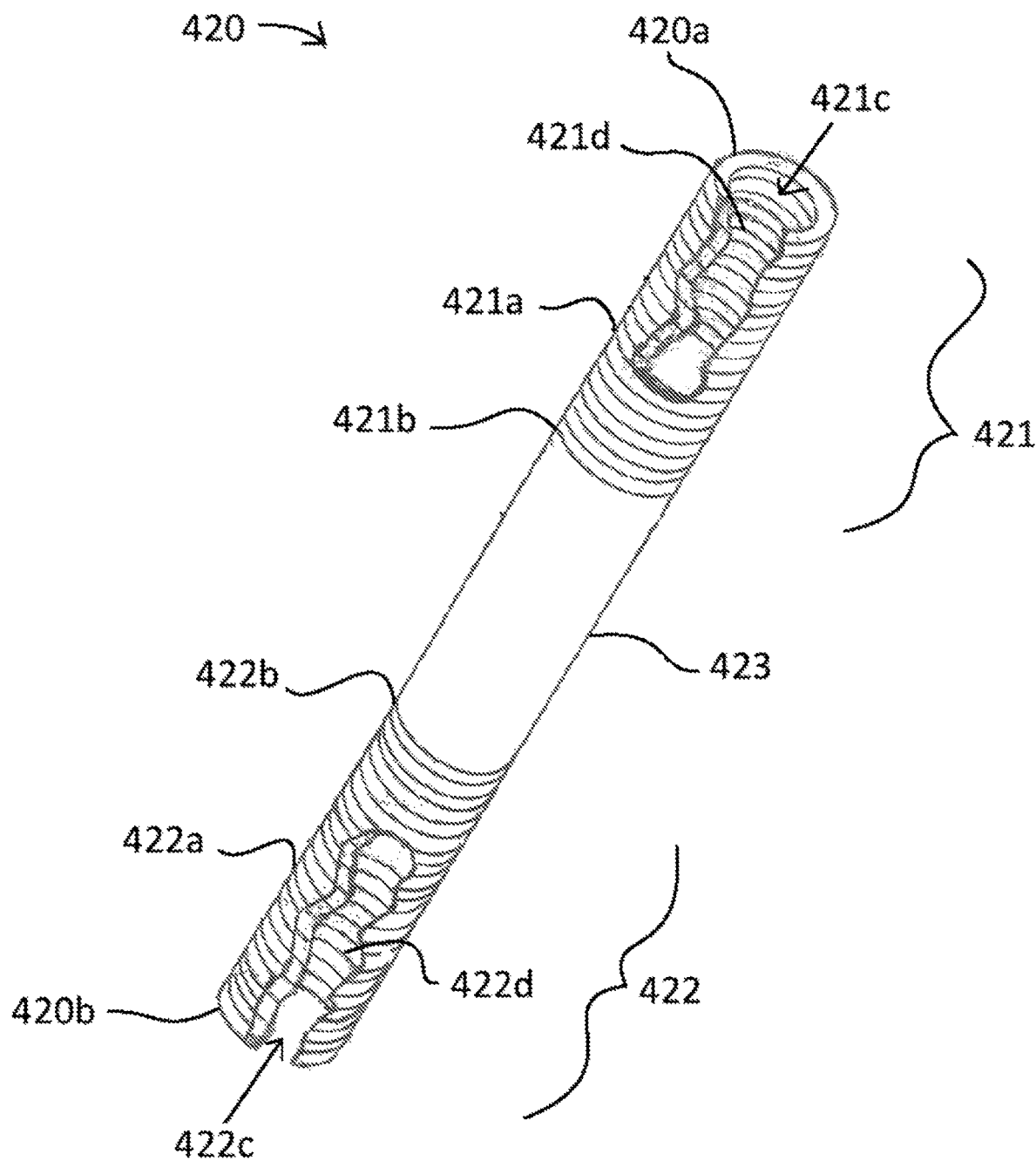
FIG. 9 illustrates a side perspective view of a key-bolt-receiving stud including a sectional view of a first section and a second section, according to another exemplary embodiment of the present general inventive concept.

FIG. 9 illustrates a side perspective view of a key-bolt-receiving stud 420 including a sectional view of a first section 421 and a second section 422, according to another exemplary embodiment of the present general inventive concept.

Although, the key-bolt-receiving stud 420 is illustrated to be a stud type fastener, the key-bolt-receiving stud 420 may be at least one of a bolt, a nail, a screw, a pin, a peg, a rivet, a threaded insert, and a threaded rod, etc., but is not limited thereto.

The key-bolt-receiving stud 420 may include a first end 420*a*, a second end 420*b*, a first section 421, a second section 422, and a shank section 423, but is not limited thereto.

The first section 421 may include a first external thread section 421*a*, a first runout 421*b*, a first key-bolt-receiving aperture 421*c*, and a first internal thread section 421*d*, but is not limited thereto.

The second section 421 may include a second external thread section 422*a*, a second runout 422*b*, a second key-bolt-receiving aperture 422*c*, and a second internal thread section 422*d*, but is not limited thereto The key-bolt-receiving stud 420 may have a predetermined length based on the user's preferences. Moreover, a length of the first external thread section 421*a* may extend at least a portion of the predetermined length of the key-bolt-receiving stud 420 beginning at the first end 420*a* and terminating at the first runout 421*b*. The first external thread section 421*a* may be oriented in the first direction or the second direction.

Referring to FIG. 9, the first key-bolt-receiving aperture 421c may be disposed within at least a portion of the first end 420a of the key-bolt-receiving stud 420. Additionally, a length of the first key-bolt-receiving aperture 421c may extend at least a portion of the predetermined length of the key-bolt-receiving stud 420. The first internal thread section 421d may be disposed on at least a portion of an inner surface within the first key-bolt-receiving aperture 421c, such that a length of the first internal thread section 421d may be less than the length of the first key-bolt-receiving aperture 421c. The first internal thread section 421d may be oriented in the first direction or the second direction.

Also, the second key-bolt-receiving aperture 422c may be disposed within at least a portion of the second end 420b of the key-bolt-receiving stud 420. Additionally, a length of the second key-bolt-receiving aperture 422c may extend at least a portion of the predetermined length of the key-bolt-receiving stud 420. The second internal thread section 422d may be disposed on at least a portion of an inner surface within the second key-bolt-receiving aperture 422c, such that a length of the second internal thread section 422d may be less than the length of the second key-bolt-receiving aperture 422c. The second internal thread section 422d may be oriented in the first direction or the second direction.

Referring to FIG. 8, the anti-loosening fastener 400 may be used to affix and/or adhere the at least one object to the at least one other object. The key-bolt-receiving stud 420 may be inserted into the aperture that extends the distance through the at least one object and the at least one other object, such that at least a portion of the first end 420a protrudes from the aperture of the at least one object and the second end 420b protrudes from the aperture of the at least one other object. Furthermore, the shank section 423 may have a smooth surface to facilitate connection of the at least one object to the at least one other object, when the at least one object and the at least one other object have a thin flange portion.

The diameter of the aperture 14 of the nut 10 may be substantially the same as a diameter of the key-bolt-receiving stud 420, such that the nut 10 may connect to the key-bolt-receiving stud 420 by rotating the nut 10 thereon.

Subsequently, the user may grip at least a portion of the front surface 11, at least a portion of the hexagonal surface 12, and/or at least a portion of the rear surface 13 to connect the aperture 14 of the nut 10 to at least a portion of the first external thread section 421a substantially near the first end 420a. Specifically, the user may rotate the nut 10 around the first external thread section 421a in the first direction or the second direction to interlock the internal thread section 14a of the nut 10 corresponding to the first external thread section 421a substantially near the first end 420a of the key-bolt-receiving stud 420. Moreover, the nut 10 may move toward a center of the key-bolt-receiving stud 420 in response to the rotation in the first direction or the second direction. Additionally, the nut 10 may stop moving in response to the rear surface 13 of the nut 10 contacting at least a portion of the at least one object.

Subsequently, the user may grip at least a portion of the knurling surface 112b of the at least one key bolt 110 to move the at least one key bolt 110 toward the first key-bolt-receiving aperture 421c of the key-bolt-receiving stud 420. A diameter of the rear cylindrical portion 110b may be substantially similar to a diameter of the first key-bolt-receiving aperture 421c. Moreover, the rear cylindrical portion 110b may be inserted into the first key-bolt-receiving aperture 421c. The user may rotate the at least one key bolt 110 in the first direction or the second direction to interlock the external thread section 114 of the at least one key bolt 110 corresponding to the first internal thread section 421d of the key-bolt-receiving stud 420. Alternatively, a torque wrench may be connected to at least a portion of the key nut 111 to rotate the at least one key bolt 110. Additionally, the at least one key bolt 110 may move toward the nut 10 in response to the rotation in the first direction or the second direction. The at least one key bolt 110 may stop moving in response to the bearing surface 113b contacting the front surface 11 of the nut 10 and/or the first end 420a of the key-bolt-receiving stud 420.

Also, at least a portion of the first external thread section 421a substantially near the first end 420a of the key-bolt-receiving stud 420 may penetrate within at least a portion of the bolt-receiving aperture 112c of the cylindrical surface 112. Specifically, the internal thread section 112d corresponding to the first external thread section 421a substantially near the first end 420a of the key-bolt-receiving stud 420 may interlock in response to the rotation of the rear cylindrical portion 110b of the at least one key bolt 110 within the first key-bolt-receiving aperture 421c of the key-bolt-receiving stud 420.

As such, the at least one key bolt 110 may prevent loosening of the nut 10 from the first end 420a of the key-bolt-receiving stud 420 based on failure problems such as flange joint separation, flange joint slipping, flange prying, flange rotation, gasket leakage, shock, impact, thermal cycle, fatigue, vibration, and/or bolt and nut relaxation. In other words, the at least one key bolt 110 may secure the nut 10 to the key-bolt-receiving stud 420, such that the at least one object and the at least one other object may remain connected.

A length of the second external thread section 422a may extend at least a portion of the predetermined length of the key-bolt-receiving stud 420 beginning at the second end 420b and terminating at the second runout 422b. The second external thread section 422a may be oriented in the first direction or the second direction Similarly, the user may grip at least a portion of a front surface 11, at least a portion of a hexagonal surface 12, and/or at least a portion of a rear surface 13 to connect an aperture 14 of another nut 10 to at least a portion of the second external thread section 422a substantially near the second end 420b. Specifically, the user may rotate the another nut 10 around the second external thread section 422a in the first direction or the second direction to interlock the internal thread section 14a of the another nut 10 corresponding to the second external thread section 422a substantially near the second end 420b of the key-bolt-receiving stud 420. Moreover, the another nut 10 may move toward the center of the key-bolt-receiving stud 420 in response to the rotation in the first direction or the second direction. Additionally, the another nut 10 may stop moving in response to the rear surface 13 of the another nut 10 contacting at least a portion of the at least one other object.

Subsequently, the user may grip at least a portion of a knurling surface 112b of another at least one key bolt 110 to move the another at least one key bolt 110 toward the second key-bolt-receiving aperture 422c of the key-bolt-receiving stud 420. A diameter of the rear cylindrical portion 110b may be substantially similar to a diameter of the second key-bolt-receiving aperture 422c. Moreover, the rear cylindrical portion 110b may be inserted into the second key-bolt-receiving aperture 422c. The user may rotate the another at least one key bolt 110 in the first direction or the second direction to interlock the external thread section 114 of the another at least one key bolt 110 corresponding to the second internal thread section 422d of the key-bolt-receiving stud 420. Alternatively, a torque wrench may be connected to at least a portion of the key nut 111 to rotate the another at least one key bolt 110. Additionally, the another at least one key bolt 110 may move toward the another nut 10 in response to the rotation in the first direction or the second direction. The another at least one key bolt 110 may stop moving in response to the bearing surface 113b contacting the front surface 11 of the another nut 10 and/or the second end 420b of the key-bolt-receiving stud 420.

Also, at least a portion of the second external thread section 422a substantially near the first end 420a of the key-bolt-receiving stud 320 may penetrate within at least a portion of the bolt-receiving aperture 112c of the cylindrical surface 112. Specifically, the internal thread section 112d corresponding to the second external thread section 422a substantially near the second end 420b of the key-bolt-receiving stud 420 may interlock in response to the rotation of the rear cylindrical portion 110b of the another at least one key bolt 110 within the second key-bolt-receiving aperture 422c of the key-bolt-receiving stud 420.

As such, the another at least one key bolt 110 may prevent loosening of the another nut 10 from the second end 420b of the key-bolt-receiving stud 420 based on failure problems such as flange joint separation, flange joint slipping, flange prying, flange rotation, gasket leakage, shock, impact, thermal cycle, fatigue, vibration, and/or bolt and nut relaxation. In other words, the another at least one key bolt 110 may secure the another nut 10 to the key-bolt-receiving stud 420, such that the at least one object and the at least one other object may remain connected.

Furthermore, anti-loosening fastener 400 may be used for a variety of flange types, such as a lap joint, a socket, a blind, a welding neck, a slip on, and threaded, but is not limited thereto. Also, the anti-loosening fastener 400 may be used in joint systems for at least one of a railway suspension system, a tractor front axle suspension system, a plurality of piping flanges, a system in petroleum, refineries, and chemical and processing industries.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An anti-loosening fastener, comprising:
a key-bolt-receiving bolt, comprising:
a head section to receive at least one tool thereon,
a rear cylindrical section disposed on at least a portion of the head section to extend a predetermined distance away from the head section, the rear cylindrical section comprising:
a key-bolt-receiving aperture disposed within at least a portion of the rear cylindrical section to receive an external fastener therein, and
an internal thread section circumferentially disposed on an inner surface within the key-bolt-receiving aperture, and
an external thread section circumferentially disposed on an outer surface of the key-bolt-receiving bolt to receive at least one other external fastener thereupon; and
a key bolt to removably connect to at least a portion of the key-bolt-receiving bolt, the key bolt comprising:
a head portion, comprising:
a flange to support a weight of an external object thereupon, and
a cylindrical surface disposed on at least a portion of a surface of the flange to receive at least a portion of the external thread section therein, the cylindrical surface comprising:
a knurled surface disposed on at least a portion of the cylindrical surface to facilitate gripping thereof,
a bolt-receiving aperture disposed within at least a portion of the cylindrical surface to receive at least a portion of the key-bolt-receiving bolt therein, and
another internal thread section circumferentially disposed on an inner surface within the bolt-receiving aperture to removably connect to the external thread section, and
a rear cylindrical portion disposed on at least a portion of the head portion to extend another predetermined distance away from the head portion.

2. The anti-loosening fastener of claim 1, wherein the rear cylindrical portion comprises:
another external thread section circumferentially disposed on at least a portion of an outer surface of the rear cylindrical portion to removably connect to the internal thread section, such that the at least one other external fastener is prevented from moving.

3. The anti-loosening fastener of claim 1, wherein a length of the internal thread section is less than a length of the key-bolt-receiving aperture.

4. An anti-loosening fastener, comprising:
a key-bolt-receiving bolt, comprising:
a head section to receive at least one tool thereon,
a rear cylindrical section disposed on at least a portion of the head section to extend a predetermined distance away from the head section, the rear cylindrical section comprising:
a shank section disposed on at least a portion of the key-bolt-receiving bolt,
an external thread section circumferentially disposed on an outer surface of the key-bolt-receiving bolt near an end thereof to receive at least one other external fastener thereupon,
a key-bolt-receiving aperture disposed within at least a portion of the key-bolt-receiving bolt to receive an external fastener therein, and
an internal thread section circumferentially disposed on an inner surface within the key-bolt-receiving aperture; and
a key bolt to removably connect to at least a portion of the key-bolt-receiving bolt, the key bolt comprising:
a head portion, comprising:
a flange to support a weight of an external object thereupon, and
a cylindrical surface disposed on at least a portion of a surface of the flange to receive at least a portion of the external thread section therein, the cylindrical surface comprising:
a knurled surface disposed on at least a portion of the cylindrical surface to facilitate gripping thereof,
a bolt-receiving aperture disposed within at least a portion of the cylindrical surface to receive at least a portion of the key-bolt-receiving bolt therein, and another internal thread section circumferentially disposed on an inner surface within the bolt-receiving aperture, and a rear cylindrical portion disposed on at least a portion of the head portion to extend a predetermined distance away from the head portion.

5. The anti-loosening fastener of claim 4, wherein the rear cylindrical portion comprises:

another external thread section circumferentially disposed on at least a portion of an outer surface of the rear cylindrical portion to removably connect to the internal thread section, such that the at least one other external fastener is prevented from moving.

6. The anti-loosening fastener of claim 4, wherein a length of the internal thread section is less than a length of the key-bolt-receiving aperture.

7. An anti-loosening fastener, comprising:

a key-bolt-receiving stud, comprising:
   a first key-bolt-receiving aperture disposed within at least a portion of a first end of the key-bolt-receiving bolt to receive a first external fastener therein,
   a second key-bolt-receiving aperture disposed within at least a portion of a second end of the key-bolt-receiving bolt to receive a second external fastener therein, and
   an external thread section circumferentially disposed on an outer surface of the key-bolt-receiving stud to receive at least one other external fastener thereupon; and at least one key bolt to removably connect to at least a portion of the key-bolt-receiving bolt, the at least one key bolt comprising:
   a head portion, comprising:
      a flange to support a weight of an external object thereupon, and
      a cylindrical surface disposed on at least a portion of a surface of the flange to receive at least a portion of the external thread section therein, the cylindrical surface comprising:
         a knurled surface disposed on at least a portion of the cylindrical surface to facilitate gripping thereof,
         a bolt-receiving aperture disposed within at least a portion of the cylindrical surface to receive at least a portion of the key-bolt-receiving bolt therein, and
         another internal thread section circumferentially disposed on an inner surface within the bolt-receiving aperture to removably connect to the external thread section, and
      a rear cylindrical portion disposed on at least a portion of the head portion to extend a predetermined distance away from the head portion.

8. The anti-loosening fastener of claim 7, wherein the key-bolt-receiving stud further comprises:
   a first internal thread section circumferentially disposed on an inner surface within the first key-bolt-receiving aperture; and
   a second internal thread section circumferentially disposed on an inner surface within the second key-bolt-receiving aperture.

9. The anti-loosening fastener of claim 7, wherein the rear cylindrical portion comprises:
   another external thread section circumferentially disposed on at least a portion of an outer surface of the rear cylindrical portion to removably connect to at least one of the first internal thread section or the second internal thread section, such that the at least one other external fastener is prevented from moving.

10. The anti-loosening fastener of claim 7, wherein a length of the first internal thread section is less than a length of the first key-bolt-receiving aperture.

11. The anti-loosening fastener of claim 7, wherein a length of the second internal thread section is less than a length of the second key-bolt-receiving aperture.

* * * * *